(12) United States Patent
Ozaki et al.

(10) Patent No.: US 9,472,809 B2
(45) Date of Patent: Oct. 18, 2016

(54) LITHIUM ION SECONDARY BATTERY

(75) Inventors: Ikuo Ozaki, Hitachinaka (JP);
Yoshimasa Koishikawa, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 278 days.

(21) Appl. No.: 14/129,369

(22) PCT Filed: Sep. 2, 2011

(86) PCT No.: PCT/JP2011/069977
§ 371 (c)(1),
(2), (4) Date: Dec. 26, 2013

(87) PCT Pub. No.: WO2013/001660
PCT Pub. Date: Jan. 3, 2013

(65) Prior Publication Data
US 2014/0127572 A1    May 8, 2014

(30) Foreign Application Priority Data
Jun. 29, 2011  (JP) ................. 2011-144202

(51) Int. Cl.
| H01M 4/02 | (2006.01) |
| H01M 4/04 | (2006.01) |
| H01M 4/66 | (2006.01) |
| H01M 4/13 | (2010.01) |
| H01M 4/139 | (2010.01) |
| H01M 10/0525 | (2010.01) |
| H01M 4/505 | (2010.01) |
| H01M 4/525 | (2010.01) |
| H01M 4/131 | (2010.01) |
| H01M 4/1391 | (2010.01) |
| H01M 4/62 | (2006.01) |

(52) U.S. Cl.
CPC ............ *H01M 4/661* (2013.01); *H01M 4/043* (2013.01); *H01M 4/0404* (2013.01); *H01M 4/0471* (2013.01); *H01M 4/13* (2013.01); *H01M 4/139* (2013.01); *H01M 10/0525* (2013.01); *H01M 4/131* (2013.01); *H01M 4/1391* (2013.01); *H01M 4/505* (2013.01); *H01M 4/525* (2013.01); *H01M 4/625* (2013.01); *H01M 2004/021* (2013.01); *Y02E 60/122* (2013.01); *Y02T 10/7011* (2013.01)

(58) Field of Classification Search
USPC .............................................. 29/623.1–623.5
See application file for complete search history.

(56) References Cited

U.S. PATENT DOCUMENTS

| 2002/0106565 A1* | 8/2002 | Hayashi ............. H01M 4/30 429/223 |
| 2004/0253516 A1* | 12/2004 | Yuasa ............. H01M 4/0435 429/231.3 |
| 2010/0261065 A1* | 10/2010 | Babinec ............. H01M 2/166 429/246 |
| 2011/0206985 A1 | 8/2011 | Ishihara et al. |

FOREIGN PATENT DOCUMENTS

| JP | 2004-192846 A | 7/2004 |
| JP | 3709446 B2 | 8/2005 |

(Continued)

*Primary Examiner* — Basia Ridley
*Assistant Examiner* — Caitlin Wilmot
(74) *Attorney, Agent, or Firm* — Volpe and Koenig, P.C.

(57) ABSTRACT

Provided is a lithium ion secondary battery capable of realizing a high energy density while maintaining output. A lithium ion secondary battery D1 according to the present invention includes an electrode having an active material mix layer 31 on both surfaces of a current collector 35. The active material mix layer 31 has a smaller void ratio in a current collector side region 34 of the active material mix layer 31 and a surface side region 32 of the active material mix layer 31 than in an intermediate region 33 between the current collector side region 34 and the surface side region 32 of the active material mix layer 31.

4 Claims, 3 Drawing Sheets

(56) References Cited

FOREIGN PATENT DOCUMENTS

| | | |
|---|---|---|
| JP | 2006-134816 A | 5/2006 |
| JP | 2011-119092 A | 6/2011 |
| JP | 2011-155003 A | 8/2011 |
| JP | 2011-175739 A | 9/2011 |
| JP | 2011-204571 A | 10/2011 |

* cited by examiner

LITHIUM ION SECONDARY BATTERY

TECHNICAL FIELD

The present invention relates to a lithium ion secondary battery including an electrode containing active material particles and a binder.

BACKGROUND ART

Lithium ion secondary batteries have been widely used as power sources for portable equipment such as VTR cameras, notebook computers, and mobile phones, and are now being used in wide fields of game machines, electric power tools, power-assisted bicycles, etc. Further, lithium ion secondary batteries are gathering attention as power sources for electric vehicles due to their high energy densities.

In order to deal with environmental issues, the automobile industry are officially developing zero-emission electric vehicles using only batteries as power sources, and HEVs (Hybrid Electric Vehicles) and PHEV (plug-in Hybrid Electric Vehicles) using internal-combustion engines and batteries as power sources, which have partially reached practical use. Moreover, the automobile industry are also developing power source batteries.

The HEVs and PHEVs, which assist the acceleration forces of vehicles by motor driving, need to have high levels of assisting force, and high outputs of power source batteries are thus required for the HEVs and PHEVs. Further, increasing the energy density of a battery makes it possible to reduce the size of the battery and to increase the driving distance of a PHEV by one charge.

When lithium ion secondary batteries are used as, for example, power sources for HEVs or PHEVs, high output batteries are necessary since momentary charging and discharging are often performed repeatedly at current values of not smaller than approximately 10 C, depending on a method of controlling the system, when vehicles are driving. The charging and discharging reactions of a lithium ion secondary battery are performed in the vicinity of the interface between active material particles and an electrolyte in an electrode. Increasing the output of the lithium ion secondary battery requires a sufficient reaction area of the active material particles and the electrolyte and a sufficient amount of electrolyte near the active material particles to be provided in the reaction region of the active material particles and the electrolyte.

Further, increasing the energy density of a lithium ion secondary battery requires increasing the amount of active material particles to be filled into an electrode for use in the lithium ion secondary battery. The electrode includes mixed particles of the active material particles, conductive assisting agent particles, and a binder.

As methods for increasing the amount of active material particles to be filled into the electrode, there are a method (see PTL 1) in which voids among the mixed particles are reduced as much as possible to increase the particle filling rate by controlling the diameters and the shapes of the active material particles, and a method in which active material particles are filled into a predetermined area as much as possible by increasing the thickness of an electrode.

CITATION LIST

Patent Literature

PTL 1: Publication of U.S. Pat. No. 3,709,446

SUMMARY OF INVENTION

Technical Problem

If a void ratio in an electrode is reduced and active material particles are densely filled in order to increase an energy density of a lithium ion secondary battery, a diffusion resistance of Li ions increases, resulting in easy occurrence of output reduction. In the meanwhile, there is a method aiming at increasing the output, in which the reaction area of active material particles and an electrolyte is made larger to reduce the reaction resistance in such a manner that the sizes of the active material particles are reduced and the surface areas thereof are reduced accordingly. This method, however, is disadvantageous in that the necessity of increasing the amounts of a conductive assisting agent and a binder makes it difficult to densely fill the active material particles and sufficiently increase the energy density of a battery.

The present invention has been made in view of the above disadvantages and aims to provide a lithium ion secondary battery capable of achieving a high energy density without reducing the output.

Solution to Problem

The lithium ion secondary battery according to the present invention includes an electrode having an active material mix layer on both surfaces of a current collector, the active material mix layer having a smaller void ratio in a current collector side region of the active material mix layer near the collector and a surface side region of the active material mix layer near the surface of the active material mix layer than in the intermediate region between the above two regions.

Advantageous Effects of Invention

According to the present invention, a lithium ion secondary battery capable of realizing a high energy density while maintaining an output can be provided. Note that objectives, configurations, and advantages which are not described above will be clarified in the following descriptions of embodiments.

DESCRIPTION OF EMBODIMENTS

Embodiments for carrying out the present invention will be hereinafter described below.

Figure 1:
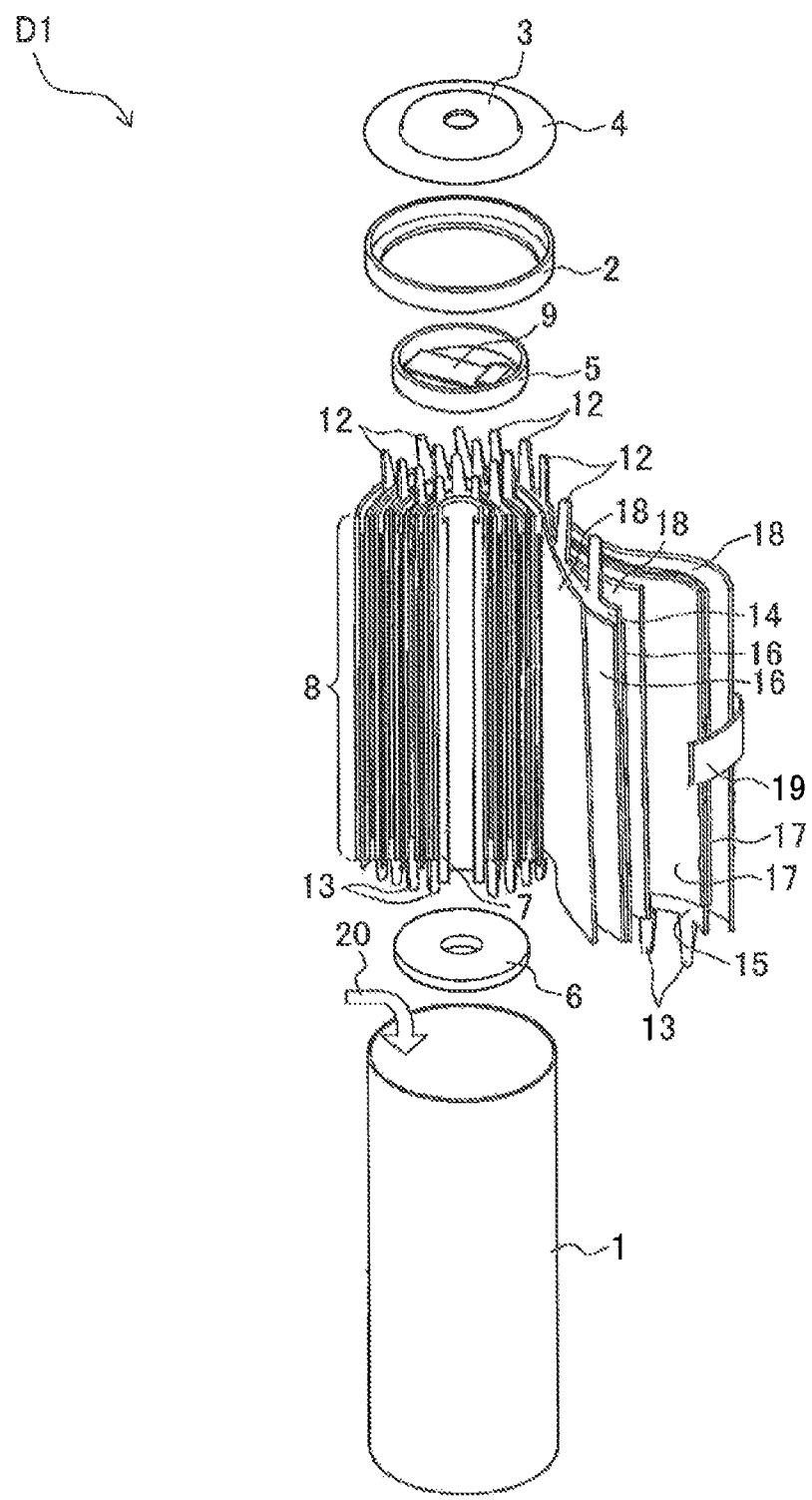
FIG. 1 is an exploded perspective view illustrating, partially with cross sections, an entire configuration of a lithium ion secondary battery according to embodiments of the present invention.

FIG. 1 is an exploded perspective view illustrating, partially with cross sections, an entire configuration of a cylindrical lithium ion secondary battery, which is a vehicle secondary battery. It is to be understood that although a cylindrical battery will be described in the embodiments, applicable electrodes are not limited to this cylindrical battery and may include other various types of batteries such as a square battery.

A lithium ion secondary battery D1 includes a positive electrode 14, a negative electrode 15, separators 18 between the electrodes 14 and 15, an electrode group 8, the electrode group 8 formed by winding the positive electrode 14, the negative electrode 15, and the separators 18, a bottomed cylindrical battery container 1 containing the electrode group 8, and a top cover section sealing the upper opening of the battery container 1, as shown in FIG. 1.

The battery electrodes (positive electrode and negative electrode) of the electrode group 8 are prepared by forming an active material mix layer containing active materials on both surfaces of a current collector. More specifically, the positive electrode 14 is a strip metal thin film of aluminum, for example, and a positive active material mix layer 16 is formed on both surfaces of the electrode 14, in other words, an inner wound surface and an outer wound surface of the electrode 14. The positive active material mix layer 16 is formed by applying a positive active material mix on both surfaces of the positive electrode 14, drying the mix, and sandwiching, pressurizing, and compressing the dried mix and the positive electrode 14 together in the thickness direction. A plurality of positive tabs 12 are provided in the long-side part of the upper area of the drawing.

The negative electrode 15 is formed of a metal thin film (current collector) of copper, for example, and a negative active material mix layer 17 is formed on both surfaces of the electrode 15. The negative active material mix layer 17 is formed by applying a negative active material mix on both surfaces of the negative electrode 15, drying the mix, and sandwiching, pressurizing, and compressing the dried mix and the negative electrode 15 together in the thickness direction. A plurality of negative tabs 13 are provided in the long-side part of the lower area of the drawing.

The positive electrode 14 and the negative electrode 15 are wound around a resin axial core 7, with porous and insulating separators 18 interposed between the core 7 and the electrodes. The outermost separator 18 is fixed with a tape 19 so that the electrode group 8 is formed. At this time, an innermost circumferential surface in contact with the axial core 7 is the separator 18 and the outermost circumferential surface is the separator 18 covering the negative electrode 15.

A positive current collecting ring 5 and a negative current collecting ring 6 are fixed in engagement with each other at both ends of the core 7. The positive tabs 12 are welded to the positive current collecting ring 5 by ultrasonic welding, for example. Likewise, the negative tabs 13 are welded to the negative current collecting ring 6 by ultrasonic welding, for example.

The battery container 1 serving as a negative terminal contains the electrode group 8 wound around the resin axial core 7, with the respective current collecting rings 5 and 6 for the positive and negative electrodes being attached to the electrode group 8. The negative current collecting ring 6 is electrically connected to the battery container 1 via a negative lead (not shown in the drawings). Thereafter, a non-aqueous electrolyte 20 is injected into the battery container 1. Further, a gasket 2 is provided between the battery container 1 and a top cover case 4 to seal the opening of the battery container 1 and obtain electrical insulation between the battery container 1 and the top cover case 4.

A top cover section is provided on the positive current collecting ring 5 to seal the opening of the battery container 1, is formed of conductive material, and includes a top cover 3 and the top cover case 4. The top cover section and the positive electrode of the electrode group 8 are electrically connected in such a manner that one of positive leads 9 is welded to the top cover case 4 and the other is welded to the positive current collecting ring 5.

The positive active material mix layer 16 includes a positive active material, a positive conductive material, and a positive binder resin. As the positive active material, lithium oxide is desirable. More specifically, lithium cobaltate, lithium manganate, nickel acid lithium, lithium iron phosphate, lithium composite oxide (lithium oxide containing at least two types of cobalt, nickel, and manganese), etc. may be used.

Moreover, the positive conductive material is not particularly limited as long as the material is capable of assisting transfer of electrons to the positive electrode, the electrons having generated from occlusion and releasing reactions of lithium ions in the positive active material mix. Examples of the positive conductive material include graphite and acetylene black.

The positive binder resin enables bonding of the positive active material, the positive conductive material, and the positive current collecting material, and is not particularly limited as long as the resin is not significantly degraded due to contact with the electrolyte. Examples of the positive binder resin include polyvinylidene difluoride (PVDF) or fluororubber.

The negative active material mix layer 17 usually includes a negative active material, a negative binder resin, and a thickening agent. Note that the negative active material mix layer 17 may include a negative conductive material such as acetylene black if needed. Examples of the negative active material include carbonic materials such as graphite, soft carbon, and hard carbon. As the negative binder resin, PVDF, for example, may be used as in the case of the positive binder resin, and styrene-butadiene copolymer rubber (SBR), for example, is also applicable.

In electrode formation, material for forming the active material mix and a solvent are mixed to prepare a dispersion solution, and the solution is slurried. Thereafter, the active material mix slurry thus obtained is applied to the surfaces of the current collector (application process) and is dried (drying process). Then, an active material mix layer formed by drying the active material mix slurry and the current collector are sandwiched together and are pressed in the thickness direction for pressurization and compression (pressing process).

As a solvent of the dispersion solution, N-methylpyrrolidone (NMP), water, etc. may be used. Examples of a method for applying the solvent include a slit-die applying method and a rolling method, examples of the drying method include hot-air circulation, infrared heating, and a combination thereof, and examples of the pressing method include a method of interposing a battery electrode between a pair of cylindrical pressing rollers and allowing the electrode to pass between the rollers so as to pressurize and compress the battery electrode from both sides.

As the active material particles forming the active material mix, there are used secondary particles containing voids formed by combining a plurality of primary particles through sintering. Further, the pressure at the pressing (pressurizing and compressing) is adjusted to a predetermined value so that the active material mix layer has a smaller void ratio in the current collector side region and the surface side region of the layer than in the intermediate region between the above two regions. In this way, an electrode is obtained in which the void ratio is reduced and the reaction area of the active material particles and the electrolyte is increased in the two directions from the intermediate region toward the current collector side region and the surface side region.

At pressing, although the volume of the active material mix layer is being reduced while the voids are being filled due to the active material particles and the conductive assisting agent particles moving toward the voids in the mix layer, a load on each active material particle is relatively larger in the current collector side region of the layer near the current with no voids, which is the destination of the moving active material particles, and in the surface side region of the layer near the surface of the layer to which the load of pressing is directly applied, than in the intermediate region between the above regions. Hence, it is possible to selectively break the secondary particles in the collector side region and the surface side region by adjusting the pressing pressure with respect to the sintering strength of the primary particles.

In the area where the secondary particles have been broken, the void ratio in the secondary particles is reduced due to compression of the voids in the secondary particles and the reaction area of the active material particles and the electrolyte is increased due to increase in the number of particles resulting from the breaking. Therefore, an active material mix layer can be formed in which the active material particles have a longer average actual circumferential length in the surface side region and the collector side region than in the intermediate region. With the active material mix layer, it is possible to obtain an electrode in which the void ratio is reduced and the average actual circumferential length of the active material particles is increased in the two directions from the intermediate region toward the surface side region and the collector side region.

Figure 2:
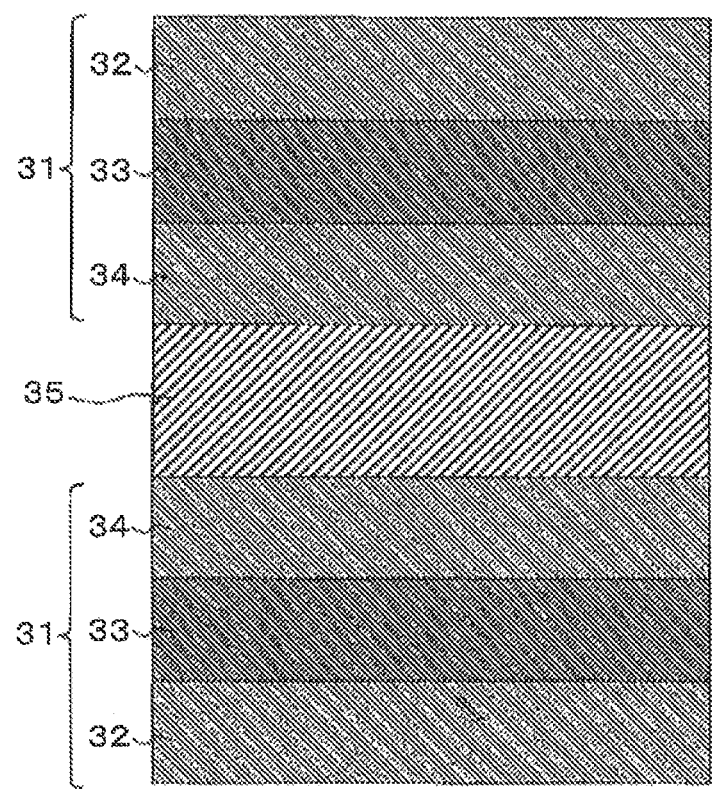
FIG. 2 is a conceptual diagram illustrating a cross section of an electrode in the thickness direction thereof according to the embodiments.
Figure 3:
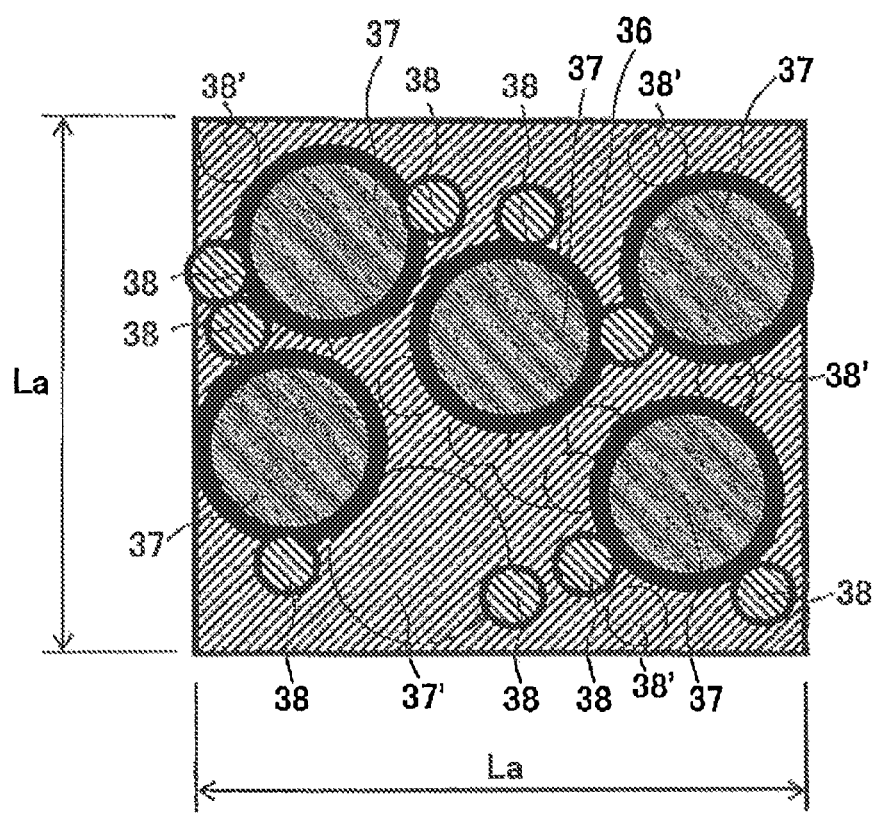
FIG. 3 is a drawing describing a void ratio and an actual circumferential length of active material particles per unit cross-sectional area of the inside of an active material mix layer according to the embodiments.

FIG. 2 is a schematic diagram illustrating a cross section in the thickness direction of the electrode according to the embodiments. FIG. 3 is a conceptual diagram of a void ratio and the average actual circumferential length of active material particles per unit cross-sectional area of the inside of the active material mix layer according to the embodiments.

In the embodiments, an active material mix layer 31 is divided in the thickness direction thereof into a surface side region 32, an intermediate region 33, and a current collector side region 34, and the void ratio and the reaction area of the active material particles and the electrolyte are adjusted for the cross-sectional area of each region of the mix layer.

Specifically, the void ratio is smaller in the surface side region 32 near the surface of the active material mix layer 31 and the current collector side region 34 near the current collector 35 in the layer 31 than in the intermediate region 33 between the regions 32 and 34. Further, the active material particles of the active material mix layer 31 have a longer average actual circumferential length in the surface side region 32 and the current collector side region 34 than in the intermediate region 33.

The void ratio is a proportion of a void portion 36 (a portion where the cross sections of the active material particles 37 and the conductive assisting agent particles 38 are not observed) per unit area to the cross section of the active material mix layer 31 in the thickness direction thereof (hereinafter referred to as the active material mix layer cross section). The reaction area of the active material particles 37 and the electrolyte is defined as the actual circumferential length of the active material particles 37 (a sum of lengths of edge portions of the cross sections of the active material particles 37) per unit area of the active material mix layer cross section. The void ratio and the average actual circumferential length are quantifiable by acquiring and analyzing an image of the active material mix layer cross section by, for example, SEM.

Any active material mix layer cross section is formed of a plurality of cross sections of active material particles and voids, based on which the void ratio and the actual circumferential length of the active material particles per unit area are determined. Further, a void ratio and an average actual circumferential length of the active material particles obtained by similarly analyzing different active material mix layer cross sections correlate with an actual void ratio in three dimensions and an actual area where the active material particles and the electrolyte are in contact with each other in three dimensions. In the embodiments, values obtained from randomly selected 30 cross sections of the active material mix layer are used as the void ratio and the average actual circumferential length.

Specifically, in the example shown in FIG. 3, the cross sections of the active material particles 37 and the conductive assisting agent particles 38 are observed within the unit area (La×La) of the active material mix layer cross section, and the portion other than the active material particles 37 and the conductive assisting agent particles 38 is the void portion (space) 36. Active material particles 37' and conductive assisting agent particles 38' are located behind the active material mix layer cross section in the image and only the appearances thereof are observed instead of the cross sections. Note that the cross sections are not observed unlike the active material particles 37 and the conductive assisting agent particles 38, and the active material particles 37' and the conductive assisting agent particles 38' have no influence on calculation of the void ratio and the actual circumferential length in a case where the image shown in FIG. 3 is used. The lengths of edge portions of all of the observed cross sections of the active material particles 37 within the unit area are added, and the value thus obtained is the actual circumferential length.

The voids in the active material mix layer 31 serve as paths for diffusing, to deal with concentration change of Li ions in the layer 31 due to battery reaction, the Li ions so as to permit the equilibrium of the concentration. In the surface side region 32, a diffusion resistance for the Li ions is not easily degraded since the distance from a separator (not shown in the drawings) abundantly storing the electrolyte is shorter than in the intermediate region 33 despite a smaller void ratio.

Further, in the current collector side region 34, which is the destination of the diffusing Li ions viewed from the separators, the diffusion resistance of the Li ions is not easily affected despite a small ratio of voids through which the Li ions are diffused. Hence, it is possible to achieve a high energy density while maintaining the output, by making the void ratio in the surface side region 32 and the current collector side region 34 smaller than in the intermediate region 33.

Moreover, it is also possible to increase the reaction area of the electrolyte and the active material particles having a lowered void ratio and prevent the output characteristics from being degraded, by increasing the number of particles by breaking the secondary particles in the surface side region 32 and the collector side region 34 and making the average actual circumferential length of the active material particles 37 in the regions 32 and 34 larger than in the intermediate region 33. Accordingly, an energy density can be further increased while the output is being maintained, so that a lithium ion secondary battery D1 can be obtained capable of further improving a volume energy density.

[Embodiments]

Embodiments of the present invention will be described below.

As the positive active material particles to be used in the embodiments and comparative examples, a lithium-nickel-manganese-cobalt composite oxide ($LiNi_{0.33}Mn_{0.33}Co_{0.33}O_2$) containing a large number of voids in the particles is employed. The void ratio in the inside of the particles roughly ranges from 20% to 50%.

Positive active material particles, carbon black powder as conductive assisting agent particles, and polyvinylidene difluoride as a binder are mixed in a mixed amount ratio of 85, 10, and 5 parts by weight, to obtain a dispersion solvent. The dispersion solvent and N-methylpyrrolidinon are mixed to prepare an active material mix slurry.

Subsequently, the slurry is applied to a current collector so that the weight of active material particles for one surface is 100 g/m², and is dried, whereby an active material mix layer is formed. Thereafter, a load condition to be provided to an electrode at pressing is made higher and a positive electrode for each of a plurality of embodiments is prepared.

In Comparative Example 1, a positive electrode is prepared having an active material mix layer using as active material particles secondary particles containing a smaller number of voids than in Embodiments 1 to 3. Comparative Example 1 is defined as a reference condition. In Comparative Example 2, a positive electrode is prepared having an active material mix layer with a void ratio which is reduced to approximately 80% of the void ratio in Comparative Example 1 by making the pressing pressure higher than in Comparative Example 1.

In Comparative Example 3, after a slurry is applied to a current collector so that the weight of active material particles is half of the weight in Comparative Example 1, an electrode is pressed and a first active material mix layer (current collector side) is formed. Subsequently, the application and pressing processes of the mix layer is repeated so that a second active material mix layer (surface side) is stacked on the first active material mix layer.

In this formation, by setting the pressure at pressing the first active material mix layer (current collector side) relatively higher than the pressure at pressing the second active material mix layer (surface side) to make the void ratio of the second layer approximately 80% of the void ratio of the first layer, a positive electrode is obtained so configured that the void ratio is reduced in one direction from the current collector side toward the surface side of the active material mix layer. In Comparative Examples 1 to 3, the weight of the active material particles for one surface is 100 g/m².

On the other hand, 90 parts by weight of amorphous carbon powder as negative active material particles and 10 parts by weight of polyvinylidene difluoride as a binder are added to each other so that a dispersion solution is prepared. Subsequently, the solution and N-methylpyrrolidinon are mixed to prepare a negative active material mix slurry. Further, having being applied to both surfaces of a current collector of 10 μm-thick rolled copper foil, the slurry is dried, is pressed, and is cut. In this way, a negative electrode is prepared.

The positive electrode and the negative electrode prepared as described above are wound together with a 40 μm-thick separator of polyethylene, to form an electrode group. Further, after the electrode group and an electrolyte is injected into a cylindrical battery container 1, a top cover is sealed by caulking. In this way, a lithium ion secondary battery is obtained.

The electrolyte is made of a solvent obtained by mixing ethylene carbonate and dimethyl carbonate in a volume ratio of 1 to 2 and 1 mol of lithium hexafluorophosphate ($LiPF_6$) dissolved in the solvent.

Moreover, the prepared positive electrode is subjected to cutting processing to acquire an SEM picture of the cross section of the positive active material mix layer in the thickness direction thereof. Next, the picture is analyzed so that the void ratio and the average actual circumferential length of the active material particles per unit area are calculated for each of the upper section, the intermediate section, and the lower section of the positive active material mix layer formed by dividing the inside of the layer into three sections in the thickness direction. Moreover, the output characteristics and the volume energies in the regions are measured and compared.

The output characteristic of the battery is calculated from the following expression (1).

Output[W]=(discharge starting voltage−lower limit voltage)÷resistance A×lower limit voltage    (1)

In an atmosphere at a temperature of 25 degrees and in a full charged state of 4.1 V, discharging is performed for 5 seconds at a current of 10 A, for 5 seconds at a current of 30 A, and for 5 seconds at a current of 60 A, and respective voltages generated from the discharging are measured. The resistance A in the expression (1) is the slope of a line obtained by straight-line approximation using the method of least squares on the basis of the relation between the currents and the corresponding voltages. The resistance A is measured after initial capacity stabilizing operation. Herein, the discharge starting voltage is 4.1 V, and the lower limit voltage is 2.5 V. For comparison of the outputs, the output in Comparative Example 1 is defined as 100%.

The volume energy density is calculated from the following expression (2).

Volume energy density[Wh/L]=3.6 V×1 C discharge capacity÷electrode group volume    (2)

As the 1 C discharge capacity, a capacitance value is used obtained by discharging the batteries of the comparative examples and the embodiments from 4.1 V to 2.5 V at the same current value. The volume energy density in Comparative Example 1 is defined as 100% for comparison.

Table 1 shows the outputs and the volume energy densities of the batteries as the battery characteristics of Comparative Examples 2 and 3 in comparison with Comparative Example 1.

TABLE 1

|  |  | Comparative Example 2 | Comparative Example 3 |
|---|---|---|---|
| Output Ratio | % | 92% | 94% |
| Volume Energy Density Ratio | % | 107% | 103% |

The battery characteristics in Comparative Example 2 in which the volume of the entire active material mix layer is uniformly compressed in a simple manner show an improved volume energy density (107%) and a notably degraded output characteristic (92%). On the other hand, in the battery of Comparative Example 3 in which the positive active material mix layer is formed of the first and second active material mix layers, the first active material mix layer near the current collector having an increase density, the output characteristic is significantly degraded despite improvement of the volume energy density (103%), and this indicates an inability to obtain sufficient suppression effect (94%).

Subsequently, Table 2 shows proportions of a void ratio and the average actual circumferential length of the active material particles per unit area in the collector side region and the surface side region to those in the intermediate region, in each of Embodiments 1 to 3 and an examining example. Further, Table 2 shows comparisons in the outputs and the volume energy densities of the batteries between Embodiments and the examining example and Comparative Example 1.

TABLE 2

| | | Embodiment 1 | Embodiment 2 | Embodiment 3 | Examining Example |
|---|---|---|---|---|---|
| Void Ratio Rate | % | 95% | 91% | 86% | 84% |
| Active Material Actual Circumferential Length Ratio | % | 109% | 118% | 127% | 136% |
| Output Ratio | % | 99% | 99% | 99% | 92% |
| Volume Energy Density Ratio | % | 101% | 103% | 104% | 105% |

In Embodiments 1 to 3 and the examining example, the active material particles formed of the secondary particles containing voids are used as described above. By adjusting the pressure at pressing to break the secondary particles, the active material mix layer is provided with such a distribution that the void ratio is reduced and the average actual circumferential length of the active material particles is increased in directions from the intermediate region to the current collector side region and to the surface side region.

The pressures at pressing are made higher in the order of Embodiments 1, 2, 3, and the examining example, so that the void ratios are reduced within the range of 95% to 84% and the average actual circumferential lengths of the active material particles are increased within the range of 109% to 136%. In the ranges according to Embodiments 1 to 3, the volume energy density is improved and the suppressing effect of output reduction is obtained. The reduction in output ratio is larger in the examining example than in Embodiments 1 to 3.

The following is a presumed mechanism of the suppressing effect for the output reduction, which has been confirmed in Embodiments 1 to 3. In the surface side region of the active material mix layer, although the void ratio is small, the distances from the separators are small and the separators have a higher void ratio and a higher electrolyte concentration than the active material mix layer. This is a reason why the diffusion resistance of Li ions is not easily degraded.

Further, another reason is that in the current collector side region, which is the destination of the diffusing Li ions viewed from the separators, the diffusion resistance of the Li ions is not affected much despite a small ratio of voids through which the Li ions are diffused.

The experiment shows that the proportion of the void ratio in the current collector side region and the surface side region to the void ratio in the intermediate region is desirably in the range of approximately 86% to 95% (the void ratio in the current collector side region and the surface side region/the void ratio in the intermediate region).

Further, it is presumed that since increasing the reaction area of the active material particles with a reduced void ratio and the electrolyte makes it possible to further prevent reduction in the output characteristics, the effect is notable when the actual circumferential length ratio of the active material particles is in the range of approximately 109% to 127% (the average actual circumferential length of the active material particles in the collector side region and the surface side region/the average actual circumferential length of the active material particles in the intermediate region).

The configuration of the present invention is not limited to the descriptions of the embodiments and various alterations may be made insofar as they are within the gist of the invention. Specifically, while the embodiments use the active material particles containing voids, active material particles not contain voids may be employed. Further, while carbon black powder is used as the conductive assisting agent particles in the embodiments, graphite or carbon nanotube such as VGCF may be used alone or in combination. Moreover, while the embodiments use polyvinylidene difluoride (PVDF) as the binder, other binder resins may be used. In addition, while the embodiments use the electrode structure according to the present invention only for the positive electrode, any type of active material particles are applicable as long as lithium ions can be inserted into and desorbed from the particles and the electrode structure may be used for both the positive and negative electrodes. As the active material particles, lithium cobaltate, lithium manganate, nickel acid lithium, a composite oxide thereof, lithium titanate, etc. may be used.

Furthermore, although the embodiments use $LiPF_6$ for the electrolyte and the mixture solvent of ethylene carbonate and dimethyl carbonate as the electrolyte solvent, the lithium salt and organic solvent are not particularly limited.

As described above, in the present invention, the active material mix layer has a smaller void ratio in the collector side region and the surface side region than in the intermediate region therebetween. In this way, there is generated a two-directional distribution in the layer and degradation of Li ions diffusion resistance is thus suppressed as much as possible. Further, since active material particles can be filled into the current collector side region and the surface side region with reduced void ratios, it is possible to realize a high energy density without degrading the output.

In addition, the active material particles with the reduced void ratios can have an increased reaction area of the electrolyte by breaking, thereby preventing reduction in the reaction area of the active material particles and the electrolyte in the voids, resulting in further suppression of degradation of output characteristic. Hence, a lithium ion secondary battery D1 can be obtained which achieves a high energy density and a high output at one time.

The advantages of the present invention are not limited to the manufacturing method. Similar advantages can be obtained as well from an electrode having a void ratio that is made smaller than the void ratio in the intermediate section between the lower section and the upper section by stacking active material mix layers of which pressed amount and the diameter of active material particles are changed by using active material particles not containing voids.

While the present invention has been described with reference to the embodiments, it is to be understood that the embodiments are only exemplary and various design alterations may be made insofar as they are within the gist of the invention disclosed in the appended claims. Specifically, while the embodiments are detailed and clear descriptions of the disclosure of the invention, the present invention does not necessarily have to include all of the described features. Further, the features of one embodiment may be partially replaced by the features of another embodiment, or the features of one embodiment and the features of another embodiment may be combined. Moreover, addition of another feature, omissions, and replacements may occur in part of the features of each embodiment.

REFERENCE SIGNS LIST 1 battery container
8 electrode group
14 positive electrode
15 negative electrode
16 positive active material mix layer
17 negative active material mix layer
18 separator
20 electrolyte
31 active material mix layer
32 surface side region
33 intermediate region
34 current collector side region
35 current collector
36 void portion (space)
37 active material particles
38 conductive assisting agent particles
D1 lithium ion secondary battery

The invention claimed is:

1. A lithium ion secondary battery comprising an electrode, the electrode including an active material mix layer on both sides of a current collector and the active material mix layer further including active material particles, wherein the active material mix layer has a smaller void ratio in a current collector side region of the active material mix layer near the current collector and a surface side region of the layer near the surface of the active material mix layer than in an intermediate region between the current collector side region and the surface side region of the active material mix layer, the active material particles have a longer average actual circumferential length in the surface side region and the current collector side region than in the intermediate region, a proportion of the void ratio in the current collector side region and the surface side region to the void ratio in the intermediate region is in a range of 86% to 95%, and a proportion of the average actual circumferential length of the active material particles in the current collector side region and the surface side region to the average actual circumferential length of the active material particles in the intermediate region is in a range of 109% to 127%.

2. The lithium ion secondary battery according to claim 1, wherein secondary particles containing voids formed by combining a plurality of primary particles are used as the active material particles.

3. The lithium ion secondary battery according to claim 2, wherein the secondary particles are obtained by sintering the plurality of primary particles.

4. The lithium ion secondary battery according to claim 3, wherein the secondary particles have such a sintering strength that the particles can be broken by pressurizing and compressing the active material mix layer.

* * * * *